United States Patent [19]

Guth

[11] 4,353,869

[45] Oct. 12, 1982

[54] AMPOULE ASSEMBLY AND HOLDER

[76] Inventor: Richard U. Guth, 439 N. 46th St., Harrisburg, Pa. 17111

[21] Appl. No.: 223,757

[22] Filed: Jan. 9, 1981

[51] Int. Cl.³ .......................... B65D 1/02; C01G 9/00

[52] U.S. Cl. .................................... 422/102; 422/104; 422/85; 241/99; 215/32

[58] Field of Search ........................ 215/32, 52 R, 355; 128/272; 206/603, 620, 623, 627; 422/85, 102, 61, 104; 495/296; 241/99

[56] References Cited

U.S. PATENT DOCUMENTS

| | | | |
|---|---|---|---|
| 1,138,764 | 5/1915 | Kline | 215/358 |
| 2,196,785 | 4/1940 | Takiguchi | 215/355 |
| 2,669,370 | 2/1954 | Royall, Jr. | 215/355 |
| 2,800,241 | 7/1957 | Brune et al. | 215/309 |
| 2,865,524 | 12/1958 | Reznek | 215/355 |
| 2,977,014 | 3/1961 | Kock | 215/32 |
| 3,019,932 | 2/1962 | Singiser | 215/309 |
| 3,151,758 | 10/1964 | Marler | 215/45 |
| 3,156,369 | 11/1964 | Bowes et al. | 215/250 |
| 3,338,447 | 8/1967 | Meyers, Jr. | 215/52 |
| 3,380,636 | 4/1968 | Ushkow et al. | 241/99 |
| 3,450,319 | 6/1969 | Ray et al. | 241/99 |
| 3,552,083 | 1/1971 | Andersen et al. | 53/37 |
| 3,595,421 | 7/1971 | Sanchis | 215/79 |
| 3,607,095 | 9/1971 | Etzlinger | 422/85 |
| 3,720,250 | 3/1973 | Goldberg et al. | 215/32 |
| 3,813,223 | 5/1974 | Fleck | 215/309 |
| 3,968,872 | 7/1976 | Cavazza | 215/309 |
| 4,089,432 | 5/1978 | Crankshaw et al. | 215/258 |
| 4,226,376 | 10/1980 | Pfleger | 241/99 |

*Primary Examiner*—Frank W. Lutter
*Assistant Examiner*—Chris Konkol
*Attorney, Agent, or Firm*—Thomas Hooker

[57] ABSTRACT

An ampoule holder receives a glass ampoule with a collar surrounding the ampoule neck to permit smooth breaking away of the ampoule tip at the collar. A stopper is inserted into the ampoule mouth and a bubbler tube is then inserted through the stopper and mouth into the interior of the ampoule to form a tight seal between the stopper and ampoule. A slit extending through the insertion portion of the stopper forms a vent passage for air flowed into the ampoule through the tube. The connection between the stopper and ampoule forms an integral ampoule assembly with the collar confined between the stopper and ampoule. The assembly may be placed in apparatus for conducting an optical analysis of liquid in the ampoule.

10 Claims, 12 Drawing Figures

Fig. 8
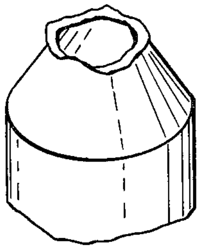
PRIOR ART BREAK
Fig. 9
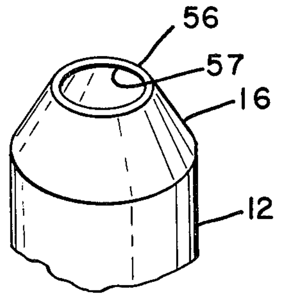
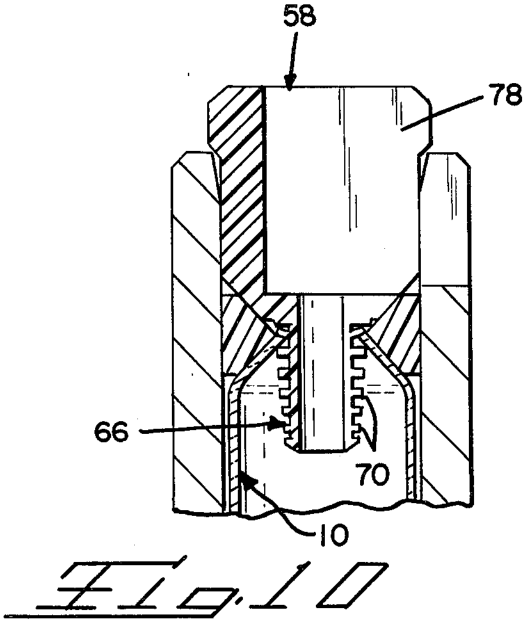
Fig. 10
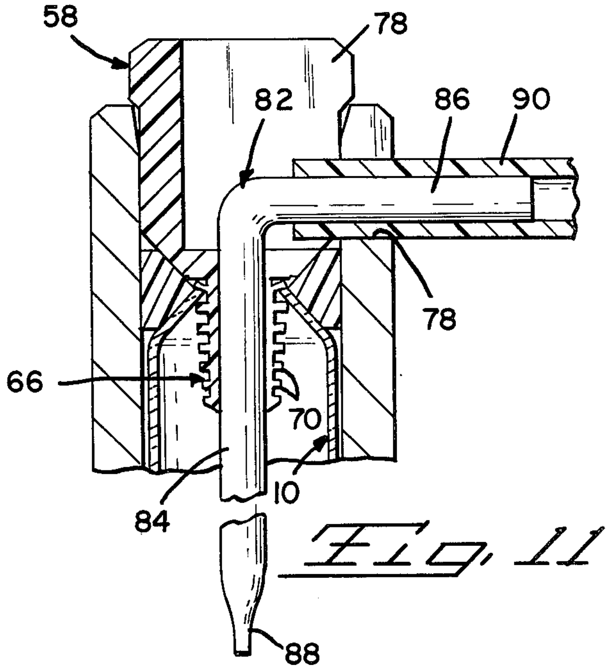
Fig. 11
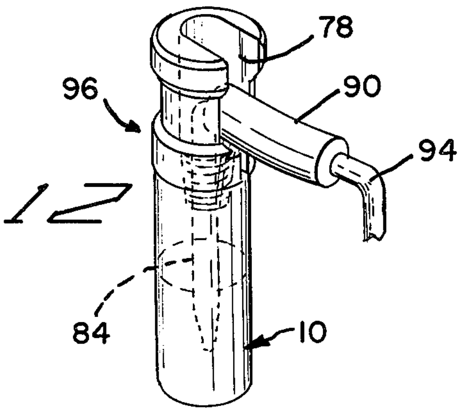
Fig. 12

AMPOULE ASSEMBLY AND HOLDER

The invention relates to equipment used to conduct gas analysis, particularly for conducting a breath test to determine whether a suspect is intoxicated.

One way of conducting a breath test is to bubble breath through a concentrated sulphuric acid and potassium dichromate solution so that the alcohol oxidizes the potassium dichromate to change the color of the solution. Solution used in conducting these tests is stored in 5 ml. glass ampoules which are broken open immediately prior to the test. A bubbler tube is loosely inserted into the freshly opened ampoule and the ampoule and bubbler tube are inserted into a recess within the testing machine. A short rubber tube connects one free end of the bubbler tube to a fixed breath outlet tube in the machine. After insertion of the ampoule and tube, the machine is nulled by bubbling a charge of alcohol-free air through the solution in the ampoule and then conducting an optical test by passing a beam of light through the ampoule and to a photocell adjacent the ampoule. Following nulling of the test apparatus, a charge of deep lung air is passed through the bubbler tube and is bubbled through the solution. Any alcohol in the breath bubbled through the ampoule is oxidized to change the color of the solution an amount proportional to the amount of alcohol present. The color change is sensed by the photooptical device.

Ampoules are broken open in the hands of the operator conducting the test and the bubbler tube is positioned loosely in the ampoule. Tipping or dropping of the ampoule easily spills the concentrated sulphuric acid solution with resulting injury to clothing, furniture or surrounding articles including the test apparatus. The acid solution is particularly dangerous to the operator and suspect and could easily injure or blind. Manually opened ampoules have rough broken edges which may easily cut the operator.

The photo-optical test directs a light beam through the ampoule to determine the color change due to oxidized solution and, consequently, the amount of alcohol in the breath bubbled through the ampoule. During the photo-optical test, the bubbler tube is loose in the ampoule. The glass tube has an index of refraction different than the index of refraction of the solution in the ampoule. If the bubbler tube is offcenter or skewed with respect to the ampoule axis, the beam of light is refracted away from the photocell target, thereby unpredictably altering the output reading. Such an unpredictable output reading severely affects the reliability of the breath test in determining intoxication and any resultant criminality.

When the ampoule is placed in the testing apparatus, there is a possibility the acid may accidentally spill from the open ampoule mouth into the apparatus undesirably corroding and possibly disabling the machine.

The volume of solution in the ampoule determines the color change per unit of alcohol bubbled through the solution. Loss of the solution destroys breath test accuracy because less solution means greater color change for a given amount of alcohol. Thus, if solution is spilled from an ampoule, the ampoule must be discarded and a new ampoule broken open and used to conduct the test. It is difficult to dispose of open sulphuric acid amouples safely.

U.S. Pat. Nos. 3,450,319 and 4,226,376 disclose hand-held ampoule breakers where an ampoule is confined between opposite sides of a flexible plastic breaker having spaced interior ribs which abut the ampoule. By squeezing the sides of the breaker, the ribs are forced together to hold the ampoule while the tip is broken away. These holders require the user to manually hold and transfer the broken, open ampoule prior to use.

The ampoule assembly and holder of the prsent invention facilitate gas analysis where a measured reactant is confined within an ampoule and the ampoule is broken open prior to use so that when gas is bubbled through the ampoule, a reaction occurs and is subsequently measured, conventionally by an optical photometer.

In conducting breath tests to determine the intoxication of a suspect, the operator uses a pre-sealed conventional 5 ml. ampoule having a slit plastic collar fitted around the ampoule neck. The ampoule is inserted into an ampoule holder so that the body has a free fit within the holder, the collar is compressed within the holder to fit snugly around the ampoule neck and the ampoule tip projects above the holder. The operator breaks the tip cleanly from the ampoule by pressing laterally on the tip while grasping the holder. The collar acts as a fulcrum to concentrate the stress at the prescored ampoule neck so that the tip breaks off cleanly without rough edges which could cut the operator. The smooth break also facilitates fitting an ampoule stopper in place within the open mouth to seal the mouth against accidental spillage.

After the tip has been broken away and discarded, the resilient collar remains biased against the inner walls of the ampoule holder and confines the open ampoule in place against accidental dislodgment. An improved ampoule stopper is moved into the free end of the holder to position a slit finned insertion portion within the ampoule mouth. Movement of the stopper toward the ampoule seats the tapered fins in the mouth with one fin above the mouth and the adjacent inner fin within the ampoule. The diameters of ampoule mouths vary over a slight range. The tapered fins assure a tight fit in all mouths. The slit is compressed during insertion of the stopper to aid in forming a tight fit.

The insertion portion includes a central bore for receiving a glass bubbler tube having an end leading laterally away from the stopper. Insertion of the bubbler tube expands the insertion portion to form a tight improved seal with the mouth while also opening the slit to assure it serves as a vent passage to exhaust gases bubbled through the solution. The lower end of the bubbler tube extends down into the solution so that gas blown through the tube is bubbled up through the solution and alcohol in the gas is oxidized. While the slit forms an effective gas vent, the passage is small and, as a practical matter, effectively confines the acid in the ampoule against accidental spillage.

The ampoule, stopper and collar form an integral ampoule assembly with the collar confined between the upper end of the ampoule and the lower end of the stopper. Following insertion of the bubbler tube, the assembly may be easily removed from the holder by raising an ejection pin carried by the holder.

After bubbling, the ampoule is tested by the photo-optical apparatus and a light beam is passed through the ampoule to determine the color change due to oxidation of alcohol in the breath. The bubbler tube is left in place during this test. The stopper holds the bubbler tube on axis within the ampoule so that it does not refract the light beam passing through the ampoule away from the diametrically aligned photocell receptor.

Following the photo-optical test, the operator may preserve the ampoule assembly by removing the rubber tube attached to the free end of the bubbler tube, caping the bubbler tube and, if desired, sealing the vent passage.

Other objects and features of the invention will become apparent as the description proceeds, especially when taken in conjunction with the accompanying drawings illustrating the invention of which there are two sheets and one embodiment.

IN THE DRAWINGS

FIG. 1 is a perspective view illustrating an ampoule and collar in position to be inserted within an ampoule holder;

FIGS. 2 and 3 are sectional views through the holder taken along lines 2—2 and 3—3 of FIG. 1 respectively;

FIGS. 8 and 9 are views illustrating broken-away ampoule mouths;

FIGS. 10 and 11 are sectional views illustrating the ampoule stopper inserted in the mouth of the ampoule within the holder; and FIG. 12 is a perspective view of an ampoule-collar-stopper assembly with bubbler tube in place.

Figure 1:
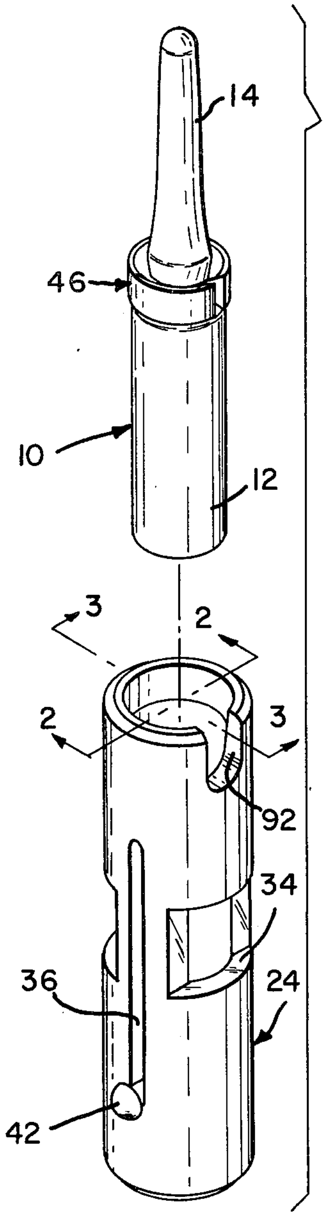
Figure 2:
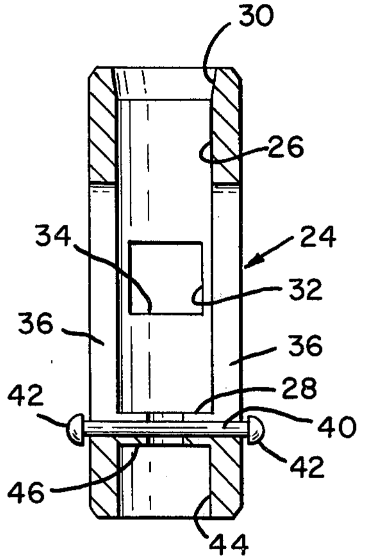
Figure 3:
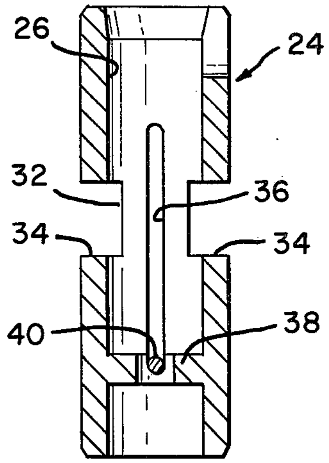

Glass ampoule 10 includes a cylindrical body 12 with an elongate tip 14 extending upwardly from the body and joined to the body by a reduced diameter neck 16. A score-line 18 may be formed around the minimum diameter portion of the neck. The ampoule is filled with a measured volume of specially formulated solution 20 of potassium dichromate and sulphuric acid. The solution is flowed into the ampoule through the open upper end of the tip 14 following which the end is heated to form a hermetic fused seal 22 confining the solution within the ampoule.

Metal ampoule holder 24 includes an ampoule body-receiving cylindrical bore 26 having a bottom 28 and a slightly outwardly flared lead-in end 30. Sight windows 32 are formed in opposite sides of the bore and have lower surfaces 34 spaced the same distance above bottom 28. A pair of longitudinal slots 36 extend along the sides of the body between the windows from below bottom 28 to a distance above the windows 32. The slots extend into step 38 defining bottom 28. An ampoule ejection pin 40 extends through the slots 36 and is confined to the holder by enlarged heads 42. A shallow, cylindrical ampoule bore 44 extends into the opposite end of the holder from bore 26 to bottom 47 also defined by step 38.

Figure 4:
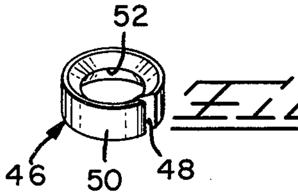
FIG. 4 is a perspective view of the ampoule collar.

After an ampoule 10 has been charged with a volume of treated sulphuric acid and tip 22 has been sealed, a specialized ampoule collar 46, shown in FIG. 4, is fitted around the neck 16. The collar is preferably formed from molded acid resistant polytetrafluorethylene plastic marketed by E. I. du Pont de Nemours & Co. under the trademark Teflon. Potassium dichromate is not oxidized by the plastic. The collar is generally cylindrical with a radial slit 48 extending through the circumference thereof. The outer collar wall 50 is cylindrical and the inner collar wall is V-shaped. The edge 52 is located about midway between the top and bottom of the collar.

The collar is placed on a sealed ampoule 10 by piloting the tip end of the ampoule through the central collar opening and then pushing the collar down over the ampoule tip until it snaps into the hourglass-shaped ampoule neck 16 as illustrated in FIG. 1. In this position, the collar is loosely confined on the neck and the collar slit 48 is open.

When the operator wishes to conduct a breath test, an ampoule is selected and tested to determine whether the ampoule body fits within minimum diameter ampoule bore 44. If the ampoule fits within the bore, the diameter is too small and another ampoule is selected. An ampoule with a body diameter greater than the diameter of bore 44 is pushed into ampoule bore 26 until the body seats on bottom 28. The body of the ampoule has a loose sliding fit within the bore.

Figure 7:
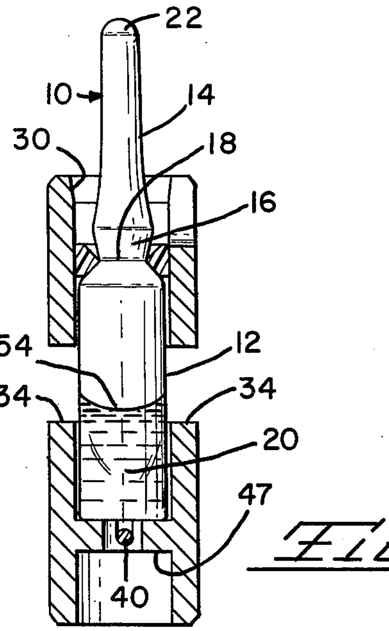
FIG. 7 is a sectional view illustrating the ampoule and collar positioned within the holder.

The outer wall of the unstressed collar carried by the ampoule has a diameter greater than the diameter of the bore 26. As the ampoule is moved into the bore, the collar is moved into the flared lead-in 30 and is compressed to the diameter of bore 26 by closing slit 48. When the ampoule is fully seated within the holder, the bottom of the ampoule is flush on bottom 28 and the collar is compressed and fitted in the upper end of the bore 26 just below the end of lead-in 30. In this position, slit 48 is partially closed and the resiliency of the collar biases the outer surface against the surface of bore 26 to form a friction fit connection between the collar and the holder to retain the ampoule in place against accidental dislodgement. Closing of the collar brings the central edge 52 against the minimum diameter portion of the ampoule neck 16 at score line 18 as shown in FIG. 7. In this way, the collar confines the ampoule in the holder with the upper portion of the ampoule body 12 supported away from the holder.

With the ampoule in the holder as shown in FIG. 7, the operator sights along lower surfaces 34 of windows 32 to assure that the acid solution meniscus 54 is above the plane of the lower surfaces. In this way the operator assures there is a minimum column of acid solution within the ampoule. The combination of the prior minimum ampoule diameter check and the acid solution height check assures the ampoule contains the minimum amount of acid solution required to conduct a reliable alcohol breath test.

After the operator has assured the ampoule holds a sufficient quantity of acid solution, the ampoule tip may be easily broken away from the ampoule body at the score line without spillage of the concentrated acid solution. The operator grasps the ampoule holder 24 in one hand and simply pushes the top of tip 14 to one side of the holder. This force biases the ampoule against collar edge 52 while the bottom of the ampoule engages the interior of bore 26. The edge 52 concentrates further lateral force at the prescored neck line 18 with the result the tip breaks away along that line to provide a clean smooth break 56 of the type shown in FIG. 9.

In practice, there may be slight irregularities along the break 56. These irregularities are considerably smaller than the irregularities formed in the conventionally broken ampoule and do not interfere with the ampoule-stopper seal.

FIG. 8 illustrates an ampoule with the tip broken away in a conventional manner by simply holding the ampoule in the operator's hand and forcing the tip to one side. This type of break includes jagged edges which not only prevent efficient use of the ampoule stopper but which also increase the likelihood of injury to the operator.

Figure 5:
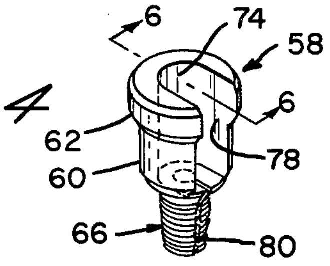
FIG. 5 is a perspective view of an ampoule stopper.
Figure 6:
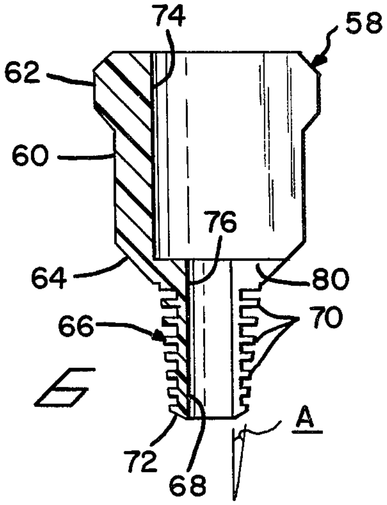
FIG. 6 is a sectional view taken along line 6—6 of FIG. 5.

After the ampoule tip is broken away, the open end of the ampoule at break 56 is closed by inserting a stopper 58 as shown in FIGS. 5 and 6 in the opening 57. The stopper is also preferably molded from polytetrafluorethylene plastic and includes cylindrical stopper body 60 with a lip 62 at the top of the body, an inwardly beveled lower end 64 and a finned insertion portion 66 including a tube 68 coaxial with stopper body 60 and a series of spaced outwardly projecting circumferential fins 70 running from the lower end of the tube to the lower end of the stopper body. The diameter of the circular fins increases from the free end of the tube to the body at an angle A of 7°. In a stopper for a standard 5 ml. ampoule, the fins typically have a thickness of 0.02 inch and are spaced apart axially from each other by a distance of 0.04 inch. The lower end of the tube 68 is provided with a 30° bevel fin 72 to facilitate initial positioning of the tube within the broken ampoule neck. The outside diameter of the bevel fin is 0.234 inch. The tube 68 is approximately 0.44 inch long and the diameter of the uppermost fin is 0.333 inch. The outside diameter of tube 68 is 0.212 inch.

A large central bore 74 is formed in body 60 and communicates with the pipe bore 76. A slot 78 having a width equal to the diameter of bore 74 is formed in one side of the body and communicates with narrow slot 80 extending the length of the insertion portion 66. The spacing between the ribs allows the ribs to be flexed up against the tube 68 during insertion of the stopper into the ampoule mouth 57 and then snap back once they pass the mouth 57.

With the broken open ampoule positioned in the ampoule holder 24 and with the collar holding the ampoule in the holder, stopper 58 is mounted on the ampoule by piloting the bevel lead fin 72 of the insertion portion into mouth 57 and pushing the stopper home into the ampoule. The stopper body 60 has a close sliding fit in bore 26. As the stopper is pushed into the ampoule the fins are moved into mouth 57. The ribs are flexed back against the tube 68 as they pass the mouth and then snap back when they enter the enlarged interior of the ampoule body. As the progressively larger fins form a tighter fit in the ampoule mouth 57, the insertion portion is flexed to reduce or close slot 80. The manual insertion of the stopper is completed when the ribs bottom against the ampoule mouth and the stopper cannot easily be further moved into the ampoule. Depending upon the size of the given ampoule mouth, full seating of the stopper may occur with the lower, middle or top ribs closing the mouth. Testing of 5 ml. ampoules indicates the ampoule mouth varies in diameter between 0.232 and 0.268 inch. The stopper efficiently seals mouths in this range. FIG. 10 illustrates the stopper seated in the ampoule mouth between the upper two insertion portion ribs. The immediate inner rib forms a seal against the interior surface of the ampoule and the immediate outer rib forms a seal against the break surface 56. Insertion of a stopper with a jagged break as shown in FIG. 8 would likely injure ribs moved past the break and impair the efficiency of the seal between the immediate outer rib and the break surface. Overinsertion of the stopper into the ampoule is prevented by engagement between the stopper beveled end 64 and ampoule collar 46. The collar supports the upper end of the ampoule body and prevents cracking during insertion of the stopper.

Following insertion of the stopper into the ampoule as shown in FIG. 10, a glass bubbler tube 82 is inserted into the stopper and ampoule as shown in FIG. 11. Tube 82 includes a straight major portion 84, an arm 86 extending 90° from one end of the major portion and a pointed bubbler tip 88 at the other end of the major portion. One end of a rubber tube 90 is attached to arm 86. The other end of the tube is attached to a breath outlet tube 94 on the testing apparatus. In this way gas flowed through tube 94 is bubbled through the ampoule. Tube 90 fits in slot 78 as shown in FIG. 12.

The bubbler tube tip 88 is piloted into pipe bore 76 and then is pushed down into the bore until the tube 90 bottoms on either the bottom of stopper central bore 74 or the bottom of tube slot 78 formed in the top of holder 24, depending upon the depth of insertion of the stopper into the ampoule. Bore 76 has a pre-insertion sliding fit around bubbler tube main portion 84. The diameter of the bore 76 is slightly reduced when the stopper insertion portion is forced into the ampoule opening and slot 80 is reduced. Insertion of the bubbler tube into the bore expands the insertion portion to improve the seal between the ampoule and ribs and also assure that slot 80 is open to vent the interior of the ampoule. When the bubbler tube is fully inserted the tip 88 extends well into the solution 20 within the ampoule so that gas blown out of the tip is bubbled through the solution and alcohol in the gas will react with the potassium dichromate. The plastic stopper does not oxidize the potassium dichromate.

The bubbler tube assures a tight connection between the stopper and ampoule. The connection orients the stopper coaxially with the ampoule axis so that the straight bubbler major portion 84 is axially aligned within the ampoule. Axial alignment of the bubbler tube is important in order to obtain accurate alcohol content measurements by passing light through the ampoule. Off-center bubbler tubes refract light passing through the ampoule to one side of the photocell receptor, thereby giving inaccurate readings.

Following insertion of the bubbler tube into the stopper and ampoule, the operator removes the ampoule, stopper and collar from holder 24 by raising ejection pin 40 up slots 36 so that the pin is moved against the bottom of the ampoule, lifts the ampoule and forces the collar 46 out of bore 26. The ejected ampoule, collar, stopper and bubbler tube form an integral assembly 96 illustrated in FIG. 12. The collar is confined between the lower portion of ampoule neck 16 and the stopper beveled end 64. The tight connection formed between the stopper and ampoule seals off the ampoule mouth 57 so that, with the exception of the small vent passage through slot 80, the solution is confined within the ampoule. In practice, it is almost impossible to spill solution accidentally from the assembly 94. This represents a marked improvement over conventional practice where bubbler tubes are positioned freely in open ampoule mouths and accidental tipping or dropping of the ampoule nearly always spill solution.

The assembly is inserted into the testing machine and tube 90 is connected on the bubbler tube 82 and outlet tube 94 and the operator conducts a breath test by first nulling the machine and then bubbling deep lung breath from the suspect through the ampoule and taking a photometric reading. Tubes 90 and 94 hold the ampoule from rotating relative to the light source and receptor, assuring the ampoule and bubbler tube are in exactly the same position when the machine is nulled and when the test is conducted. Upon completion of the breath test the assembly may be preserved for future reference by removing tube 90 and plugging the bubbler tube and vent.

The collar and stopper of assembly 94 surround the sharp edges at ampoule break 56 to assure the ampoule in the assembly may be easily handled without cutting the operator. The ribs 70 are sufficiently flexible so that they may be bent upwardly during insertion through the mouth and snapped back into the larger diameter interior of the ampoule. The spacing between adjacent ribs permits the ribs to bend as they are moved past the mouth. The 7° angle for the ribs assures that the stopper can form a tight seal with ampoules having different diameter mouths while preventing sufficient pressure from being applied to the mouth to crack the relatively brittle ampoule glass during insertion. This is a problem because the ampoule break 56 is not smooth or stress relieved.

Assembly 96 provides a baffle around the outlet of vent slit 80 to collect droplets of solution entrained with gas vented during bubbling. Such droplets are captured on the surfaces of bore 74, slot 78, bubbler tube 82 or rubber tube 90 so that they are not carried away from the assembly. During conventional breath testing using a bubbler tube loosely positioned within an open ampoule mouth entrained acid solution droplets are blown out of the ampoule and fall freely on the test machine and surrounding area. With repeated use, these droplets can severely corrode the test machine. The assembly baffle also protects the solution in the ampoule from outside contaminants.

While the invention has been described in connection with a sulphuric acid and potassium dichromate ampoule and the use of such an ampoule in conducting chemical breath tests, it is not limited to such uses and may be used with different ampoules and purposes other than chemical breath testing.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. The combination of an ampoule having a body, a tip and a reduced diameter neck joining the tip and body wherein the improvement comprises an annular collar formed from a stiffly resilient material having a slit extending through the circumference thereof, said collar being fitted around the ampoule neck with the ampoule body and tip extending to either side of the collar, the interior opening of the collar being normally smaller than the exterior of the tip, the collar including an inner edge engaging the minimum diameter portion of the neck when the slit is relatively closed to form a fulcrum for breaking the tip away from the ampoule body, said collar being moveable over said tip to the reduced diameter neck by relatively opening said slit to enlarge the interior opening of the collar and permit movement of the collar over the ampoule tip to the neck.

2. The combination of claim 1 wherein when the slit is closed, the edge abuts the minimum diameter portion of the neck.

3. The combination of claim 2 wherein the outer surface of the collar is generally cylindrical and the surface of the collar adjacent the ampoule neck is V-shaped with the apex of the V defining the edge.

4. The combination of claim 3 wherein the ampoule is filled with a volume of acid and the collar is made of an acid resistant material.

5. The combination of claim 4 wherein the collar is formed of polytetrafluorenthlyene plastic.

6. An ampoule holder comprising a body having an ampoule bore with a mouth at one end and a bottom at the other end, a pair of windows formed in opposite sides of the bore, each window having a sight surface located adjacent the bottom, the distance between the bottom and said surfaces being the same so that when the bore is held vertically, a visual sight may be made across the interior of the bore using said surfaces to determine whether an ampoule seated within the bore contains a minimum volume charge, a pair of opposed slots in the body extending along the length of the bore between the windows from below the bottom toward the open mouth, an ampoule ejection pin in the slots extending across the bore and means for confining the pin in the slots whereby the pin may be moved from below the step toward the mouth to eject an ampoule from the bore.

7. An ampoule holder as in claim 6 including a flared lead-in surface at the mouth of the bore and a second ampoule bore coaxial with said first bore having a mouth facing away from said first bore mouth, the diameter of said second ampoule bore being less than the diameter of said first ampoule bore.

8. An ampoule holder as in claim 6 wherein said sight surfaces lie on a plane perpendicular to the axis of said bore.

9. The combination of an ampoule holder comprising an ampoule bore with a mouth at one end and a bottom at the other end, an ampoule having an ampoule body, a tip and a reduced diameter neck joining the body to the tip; and a resilient collar fitted around the ampoule neck having an inner edge facing the minimum diameter portion of the neck, an outer surface conforming to the bore and a slit extending through the circumference, the unstressed collar being larger than the bore, said ampoule being fitted within the bore with the bottom of the ampoule resting upon the ampoule holder bottom and with the tip extending outwardly of the mouth and said collar being compressed within the interior of the bore to restrict the slit and form a frictional fit with the holder, the collar edge contacting the minimum diameter portion of the ampoule neck and thereby confining the ampoule in the holder.

10. The combination of claim 9 wherein the said ampoule body has a loose fit in the bore whereby a lateral force on said tip biases the minimum diameter portion of the ampoule neck against the collar edge as a fulcrum and facilitates a clean breaking away of the ampoule tip from the ampoule body at the neck.

* * * * *